C. F. LAGANKE.
PEANUT SKINNING DEVICE.
APPLICATION FILED JULY 9, 1915.
1,190,560.
Patented July 11, 1916.
3 SHEETS—SHEET 1.
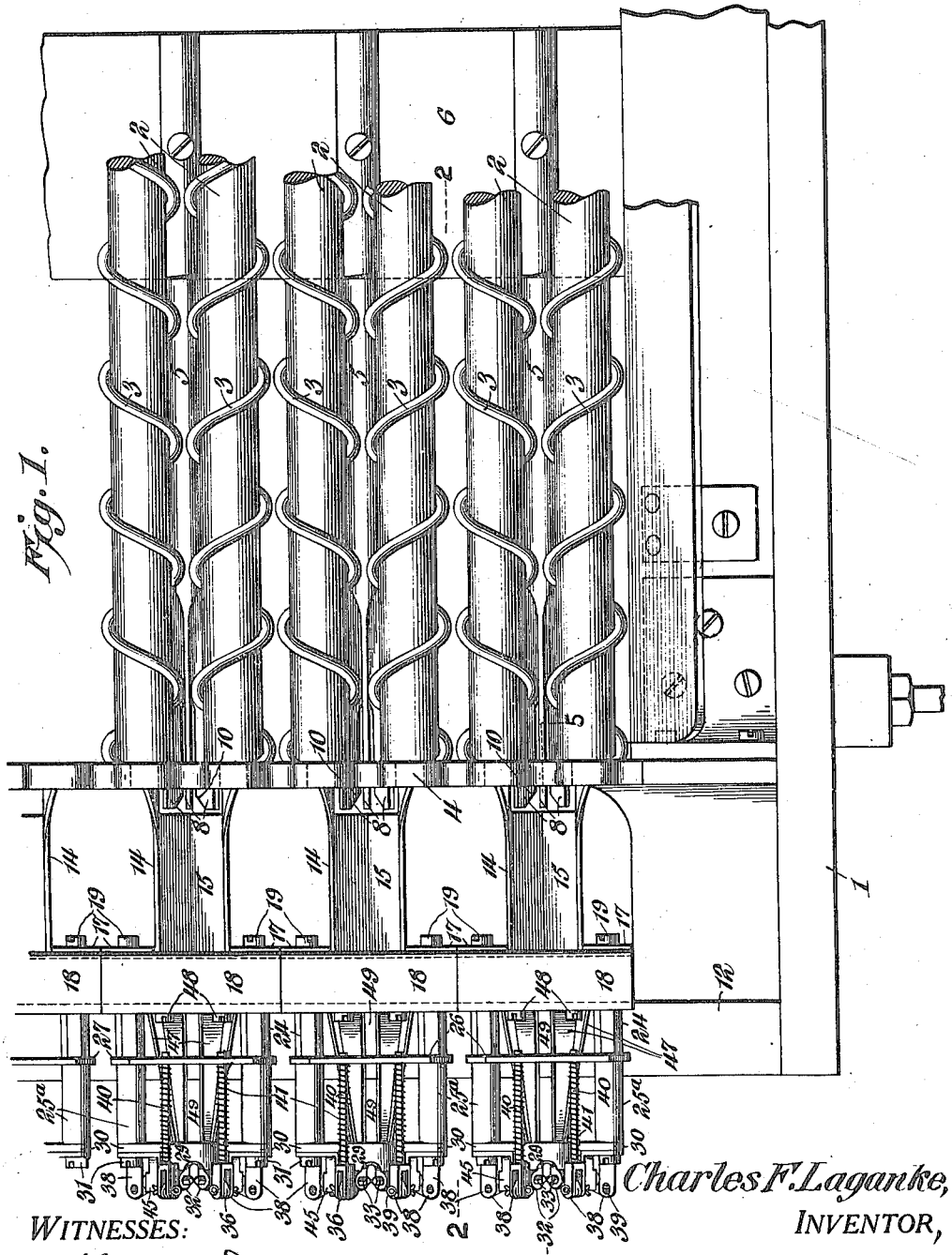
WITNESSES:
Howard D. Orr.
F. T. Chapman.
Charles F. Laganke,
INVENTOR,
BY
Attorney

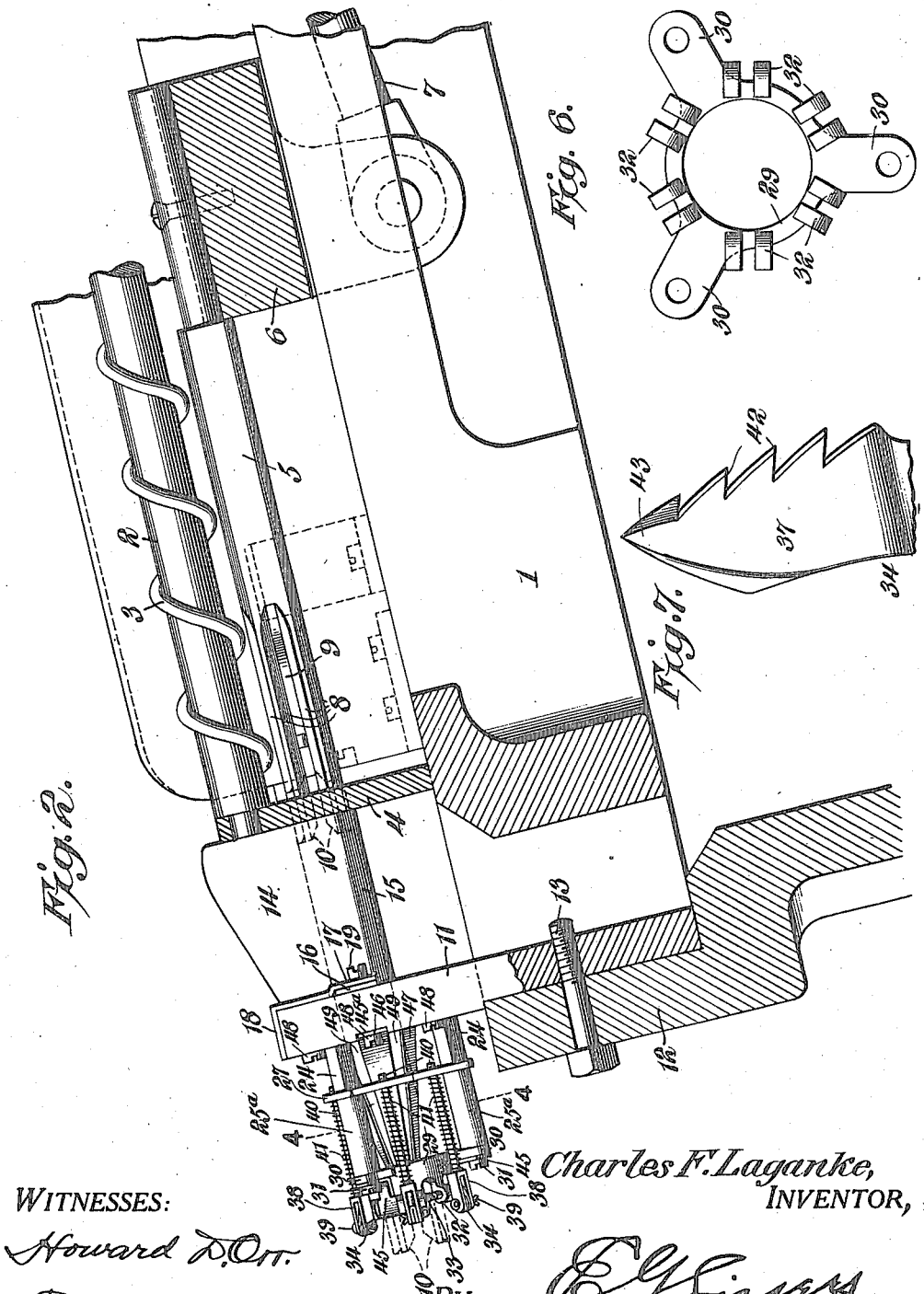

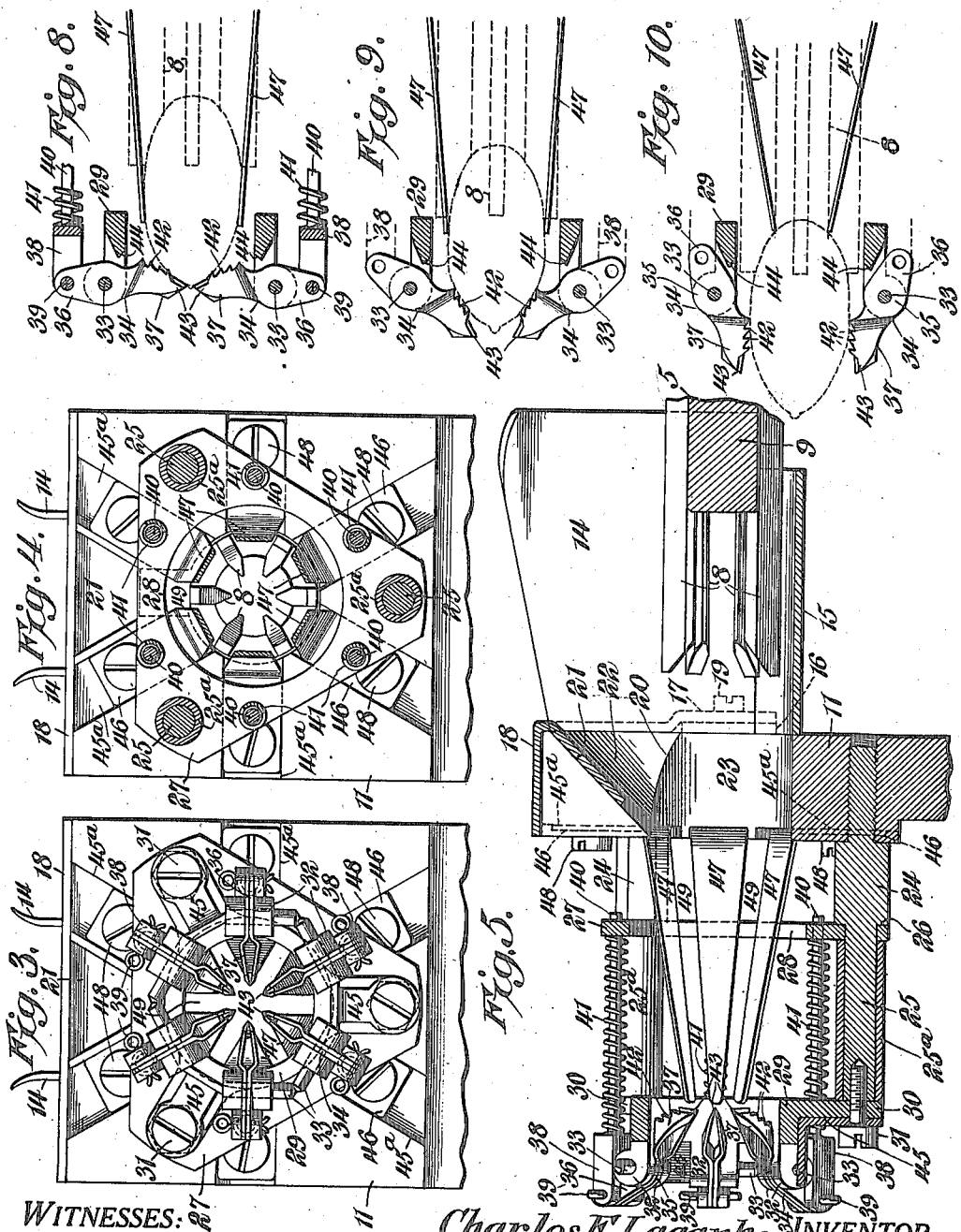

UNITED STATES PATENT OFFICE.

CHARLES F. LAGANKE, OF CLEVELAND, OHIO, ASSIGNOR TO THE KELLY COMPANY, A COPARTNERSHIP COMPOSED OF WILLIAM H. KELLY AND LOUIS A. KELLY, OF CLEVELAND, OHIO.

PEANUT-SKINNING DEVICE.

1,190,560.

Specification of Letters Patent. Patented July 11, 1916.

Application filed July 9, 1915. Serial No. 38,959.

*To all whom it may concern:*

Be it known that I, CHARLES F. LAGANKE, a citizen of the United States, residing at Cleveland, in the county of Cuyahoga and State of Ohio, have invented a new and useful Peanut-Skinning Device, of which the following is a specification.

This invention has reference to peanut skinning devices and its object is to produce means whereby the skin or covering of peanut kernels may be readily removed without breaking the peanut kernels in a manner to produce what are commercially known as "splits".

The device of the present invention is designed to operate upon peanut kernels after such kernels have been cooked by roasting or boiling in water, or cooked in oil, the last-named treatment being known as French frying.

The invention comprises means for propelling the peanut kernels through a tubular duct of an outwardly yielding nature, whereby the peanut kernel is subjected to embracing pressure and is caused to travel in the direction of its longitudinal axis. In advance of the tubular duct in the direction of travel of the peanut therethrough there is provided a circular series of yieldable dogs normally in conical arrangement with the apex toward the on-coming end of the traveling peanut, and those portions of the dogs designed to engage the peanut kernel are toothed or roughened so as to break the enveloping skin of the peanut kernel and peel it from the kernel as the latter is forced through the series of dogs. The conical arrangement of the dogs, which have pivot supports more distant from the center line of travel of the peanut than the active portions of the dogs, provides for the approach of the nose ends of the dogs toward each other until the dogs are all in substantially radial relation to such line of travel, and then recede and spread apart as the peanut progresses, whereby the skin torn apart by the dogs is held relatively stationary as the peanut is ejected, thus effectively skinning the peanut from one end to the other. The dogs being elastically constrained again approach as the peanut is ejected, and thus effectively follow up the then rear end of the peanut to remove the last vestige of skin that might otherwise remain.

The present invention while capable of operation by hand, is designed more particularly for use in connection with a machine whereby the peanut kernels, or as they are commonly known, the peanuts, may be effectively and economically skinned or blanched on a commercial scale with the production of but a very small percentage of splits.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings but may be changed and modified so long as such changes and modifications come within the scope of the appended claims.

In the drawings:—Figure 1 is a plan view of a portion of a machine for blanching peanuts with the invention applied, the view being taken perpendicular to the plane of the portion of the machine shown. Fig. 2 is a section on the line 2—2 of Fig. 1, but showing the part of the machine illustrated tilted at about the angle customarily employed to provide for the feeding of the peanuts to an extent by gravity. Fig. 3 is a front elevation of one of the skinning devices on an enlarged scale. Fig. 4 is a section on the line 4—4 of Fig. 2, but drawn on the scale of Fig. 3. Fig. 5 is a section on the line 5—5 of Fig. 1 but drawn on the scale of Fig. 3. Fig. 6 is a face view of the dog-carrying frame also drawn on the scale of Fig. 3. Fig. 7 is a view of the jaw end of one of the dogs on an enlarged scale. Figs. 8, 9 and 10 are more or less schematic views illustrating the action of the dogs in removing the skin from the peanuts.

In order to understand the purpose and action of the structures making up the device of the invention, it is necessary to have an appreciation of the characteristics of cooked peanuts and the conditions which must be met in order that the cooked peanuts may be skinned or blanched without breaking the kernels apart.

Generally considered a peanut kernel is an irregularly ovocylindrical dicotyledon, with the cotyledons more or less flattened at their meeting surfaces where they are nonadherent except at the radicle end. The cotyledons as they come from the shell are enveloped in a skin or epidermis, usually quite nonadherent, especially after the peanuts have been cooked, although sometimes the skin is more or less tenaciously adherent either all over the peanut or in localized spots. The junction of the cotyledons being confined to the radicle end only, and such junction in the cooked peanuts being very brittle provides but an indifferent union of the cotyledons very easily broken by even small forces so applied to the peanut kernel as to move them in the plane of the contacting faces of the cotyledons or in a direction to move the cotyledons one away from the other.

It is because of such frailty and friability of the connection between the cotyledons that it has heretofore proven so difficult to remove the skin without breaking the cotyledons apart either by hand or machine, except where provision has been made for subjecting the peanut during the skinning operation to an enveloping compression firm enough to hold the cotyledons against displacement one relative to the other and yet sufficiently gentle to avoid such scoring of the outer surfaces of the cotyledons as would be harmful to them, especially in appearance. However, while devices for removing the skins from the peanuts without breaking the cotyledons apart have been proposed prior to the present invention, it has been found that there is a liability of but imperfectly removing the skin, and additional skinning devices are needful to insure the complete removal of the skin, although even such arrangements are not always successful when the skin adheres more or less tenaciously to the peanut. It is such conditions that are taken care of by the device of the invention, and by the one operation practically all peanuts propelled through the skinning device are completely denuded of the skin without any such scoring of the outer surface of the peanut as will affect its commercial value, and this is accomplished with but a very small proportional production of "splits" which result from the breaking of the junction of the cotyledons at the radicle end.

In order that the operation of the invention may be more clearly explained it is shown in conjunction with a portion of a machine illustrated and described in an application of William H. Kelly for peanut blanching machine, Serial No. 43,607 filed August 4, 1915.

In the drawings there is shown a small portion of a frame 1 constituting the bed of the machine, and in Fig. 2 this frame is shown tilted at a small angle to the horizontal but sufficient to produce a gravity feed of the peanuts, which gravity feed is assisted by mechanical means during a portion of the travel of the peanuts through the machine.

The mechanical means comprises a pair of elongated rollers 2 having helical surface ribs 3 with the rib of one roller of a pair of opposite trend to that of the other roller of the same pair. The rollers of a pair are parallel one with the other and spaced apart a distance less than the thickness of the peanut kernels to be treated, but usually permitting the dropping of splits between the rollers, whereby splits are practically eliminated from treatment by the skinning devices. This is advantageous since splits usually are free from skin and masses of shelled peanuts before being skinned usually contain a proportion of broken and skinned kernels.

The rollers 2 are tilted in conformity with the tilt of the frame 1 and at their lower ends are journaled in a cross plate 4, these rollers being driven by means customarily located at the other or upper ends, but which means are neither shown nor described herein since they have nothing to do with the present invention.

The plate 4 is traversed by the active or front ends of a series of elongated plungers 5 which at the other or rear ends are carried by a cross-head 6 mounted to reciprocate in the frame 1, motion being imparted to the cross-head by a pitman 7 connected thereto and driven by suitable mechanism neither shown nor described because not forming part of the present invention. The forward or active end of each plunger 5, this being the end toward the left as viewed in Figs. 1 and 2, is in the form of a circular series of circumferentially spaced longitudinally extended blades or fingers 8 disposed about the central core 9 in radial planes. The core 9 is of less longitudinal extent than the blades, so that the free extremities of the latter project beyond the core and each terminates in a beveled end 10 with the bevel toward the longitudinal center line of the plunger, thereby providing a more or less conical seat which, as will hereinafter appear, is designed to receive either end of a peanut kernel.

Spaced forwardly from the plate 4 in the direction of active travel of the plunger are a series of blocks 11 supported by a web or cross bar 12 of the main frame, each block 11 being secured to the web 12 by a screw 13 or in any other appropriate manner. In the particular construction shown the blocks 11 all abut at their side edges and are so seated against the web 12 that the single screw 13 for each block is sufficient to firmly hold it in place and permit its ready removal.

Fast to what may be termed the rear face of each block is a trough-like receptacle 14, which in the particular showing of the drawings is of sheet metal conveniently bent into shape. The trough 14 is of a width to freely but closely receive and be traversed by a respective plunger 5 which at the forward end is of generally polygonal cross-section and usually of hexagonal cross-section because ordinarily the plungers have six relatively thin blades or fingers equi-distantly arranged about the longitudinal axis of the plunger. For this reason also the receptacle 14 has an angular bottom portion 15. Each plunger 5 is located intermediately beneath the associated rollers 2 of a pair of rollers and the width of the receptacle 14 is such as to readily receive peanuts propelled by the ribs 3 over the upper edge of the cross plate 4. The ribs 3 are of such pitch that their turns are spaced apart by distances about equal to the lengths of the longest peanuts to be treated, wherefore, as the peanuts are propelled by the rollers they are kept separate one from the other and by the coaction of the rollers and ribs the peanuts are constrained to move along the rollers in the direction of their longitudinal axes so that the peanuts are deposited in the receptacles 14 lengthwise of the latter. Each receptacle 14 has its internal width too short to permit peanuts to lie therein in any direction except lengthwise of the receptacle or trough. Each receptacle 14 is provided with side lugs 16 over which the legs 17 of clips 18 engage, said clips overriding the tops of the blocks 11 and are fastened in place by screws 19 also traversing the lugs 16. The length of each trough 14 is sufficient to reach from the respective block 11 to the cross plate 4. Each block 11 where engaged by a receptacle 14 has a passage 20 therethrough with the bottom of the passage coinciding with the bottom 15 of the trough, while the top of the passage may extend to the top of the block and is there restricted in effective size by an inturned lip 21 of the top portion of the clip 18. The passage 20 has the upper end 22 tapering from that face of the block engaged by the receptacle 14 toward the other face of the block, so that the passage 20 has a straight through portion 23 of substantially circular contour of such diameter as to permit the free passage of the blade or finger end of the plunger 5. Screwed into, as shown, or otherwise attached to the face of the block 11 remote from that to which the receptacle 14 is attached, is a series of posts 24 each having a portion of its length of reduced diameter, as indicated at 25, thus providing a shoulder 26 relatively close to but spaced from the block 11.

There are three posts 24 in the particular showing of the drawings spaced apart by one hundred and twenty degrees and mounted on these posts and held by sleeves 25ª is a guide plate 27 of substantially triangular contour, but with a central circular opening 28 therethrough. Applied to the outer ends of the reduced portions 25 of the posts 24 is an approximately circular frame 29 having three equi-distant radial legs 30 secured to the outer ends of the posts 24 by screws 31. The ring 29 is provided with a circular series of pairs of ears 32, the ears of each pair being spaced apart and these ears outstand from the ring 29 in parallel relation to the longitudinal axis of the ring, said ring being somewhat elongated axially.

Mounted upon a pivot pin 33 traversing each pair of ears is a dog 34 having an intermediate eye portion 35 through which the pin 33 projects and terminal portions 36 and 37. The end 36 is mounted in a slotted block 38 by means of a pin 39, which in the particular showing of the drawings is a cotter pin, thus insuring a readily removable pivotal connection proof against accidental escape. Each head 38 is provided with an elongated stem 40 projecting through a suitable passage in the guide plate 27, and between this guide plate and the head 38 each stem 40 is surrounded by a spring 41 tending at all times to move the head 38 away from the guide plate 27, but yieldable to forces tending to move the head toward the guide plate.

Each dog 34 is in the particular showing of the drawings formed of a piece of thin sheet steel bent upon itself with the portions of the plate forming the end 37 spread apart, and then approaching to provide a laterally expanded jaw, and this jaw is provided with a series of teeth 42 on each member of the jaw ending in a single terminal longitudinally arranged tooth 43 tapered from opposite sides and ending in a relatively sharp or stabbing point. The teeth 42 are more or less chiseled shaped somewhat like saw teeth, and their points together with the point of the tooth 43 define a slightly rounded contour.

That tooth 42 of each dog nearest to the eye 35 is so related to the ring 29 that it engages the bottom of the throat between the ears 32 where the throat is slightly beveled, as indicated at 44, or is so related to the dog as to serve as a stop limiting the movement of the dog about its pivot 33 under the action of the spring 41. The screws 31 each carry an angle stop 45 having a leg interposing between the adjacent ends of two pivot pins 33, while the other ends of the pivot pins engage each other, wherefore the stops 45 when in place effectively prevent the escape of the pins 33 while admitting of the withdrawal of the pins 33 in the absence of the stop 45.

The active ends or jaws 37 of the dogs are of such length that when these dogs are radial to the longitudinal axis of the ring 29 the extremities of the teeth 43 are in very close relation, but when the dogs are in normal position against the stops or shoulders 44 the dogs define a cone with the apex presented toward the opening 23 of the block 11. The extent of movement of which each dog is capable is sufficient to permit the dogs to approach nearly into parallelism with the longitudinal axis of the ring 29, in which case the jaw ends 37 of the dogs are in the most remote relation to the block 11. That face of the block 11 remote from the receptacle 14 is provided with a series of radial channels 45ᵃ in each of which is seated the angle base end 46 of a tapering spring finger 47, the finger being held by a screw 48 traversing the base 46 and tapped into the block 11. These fingers have their basic or larger ends arranged in a circular series about the opening 23 and are spaced apart to provide passages 49 alining with the blades or fingers 8 of the respective plunger 5. The fingers 47 define a tubular guide for the peanuts tapering toward and terminating just short of the toothed ends 43 of the jaws of the dogs 34 when the latter are in their normal conically arranged position, with the apex of the cone close to the free ends of the spring fingers or tongues 47. Moreover, each dog is in line with a respective tongue or finger 47 and as the jaw portions of these dogs taper toward their free ends the jaws are spaced apart sufficiently to permit the passage of the blades 8 between them at all times, and the jaws may always swing about their pivots without engaging the blades 8 even though such blades be at the time projected through the jaw zone.

The spring tongues 47 tapering toward their free ends are also there quite elastic and are so initially adjusted as to their elasticity that they first engage a peanut traveling through the tubular guide close to the forward end of the peanut in the direction of travel of the latter and as the peanut progresses these fingers yield to the increasing diametric size of the peanut without, however, bearing upon the peanut with sufficient force to injure its surface. At the same time the pressure exerted upon the peanut is substantially an enveloping pressure of sufficient force to hold the cotyledons in firm contact, and since this force is applied at numerous points about the peanut any lateral displacement of the cotyledons is wholly prevented. Under such circumstances the liability of rupturing the junction of the cotyledons at the radicle end, even though this junction be of a very friable nature, is practically eliminated. The chance of any disastrous action of distorting forces is further prevented by forcing the peanut through the yieldable tubular guide in a straight line without any turning or twisting motion of the peanut.

In the commercial structure the travel of the plunger 5 is such that in the retracted position its forward end is withdrawn from the receptacle 14 and at the completion of its active stroke the forward end of the plunger is projected through the cage of dogs and about coincident with the outer ends of these dogs after they have been rocked to about their full extent in opposition to the springs 41. The forward or active stroke of the plunger is sufficient to engage a peanut deposited in the trough 14 from the feeding rollers 2 and project it from the trough through the passage 23 into and through the tubular guide formed by the spring tongues 47 and into engagement with the dogs 34 and through the circular series of dogs causing them to yieldingly separate, and finally to eject the peanut, so that it wholly escapes from the skinning devices.

Let it be assumed that a peanut has been deposited in a receptacle 14 and that the plunger 5 individual to said trough is moving forwardly, the active end of the plunger ultimately engages the end of the peanut presented toward it, forcing the other end of the peanut from the trough through the passage 23 and into the tubular guide formed of the spring tongues 47, which latter serve to centralize the peanut so that it travels in a straight line coincident with the longitudinal center line of the tubular guide. The forward end of the peanut in the direction of travel thereof engages the elastic end portions of the tongues 47 causing them to expansively yield as the larger portion of the body of the peanut engages them, but as before explained, the peanut is at this time subjected to an enveloping pressure of sufficient, though gentle force. Ultimately the forward end of the peanut is brought into contact with the forward teeth 43 of the jaws of the dogs 34. The urging force exerted upon the peanut by the plunger 5 now causes the peanut to rock the dogs, whereupon the extremities of the teeth 43 engage the portion of the skin at the then front end of the peanut and digging into its skin break and shatter it. The dogs do not initially engage the forward end of the peanut at its point, but at some distance back of the point or to one side of the center, and then the extremities of the teeth 43 approach as the jaws 37 are moved toward the radial position, thus piercing the skin and loosening it from the forward extremity of the peanut while the toothed edges of the jaws rock upon the forward end of the peanut and the jaws are forced apart turning about their pivot pins 33, and at the same time compressing the springs 41.

The peanut moving in a relatively straight line while the jaws rock on short arcs described about the pivot pins 33, causes the peanut to progressively move with relation to the jaws, so that the forward end of the peanut begins to emerge from the spreading jaws, which jaws, however, because of the springs 41, exert a compressive force upon the peanut. The teeth 42 act upon the skin of the peanut in order and these teeth being retrogressive with relation to the direction of travel of the peanut drag upon the skin, thus holding it back while the peanut is pushed forward by the plunger. This dragging action most effectively removes the skin from the peanut kernel and this action is found to take place even though the skin adhere with some considerable tenacity to the surfaces of the peanut, and ultimately as the peanut is finally ejected from the jaws of the skinning dogs it is wholly free from the skin.

As the jaws are rocked about their pivot pins in opposition to the springs 41 the leverage relation of the dogs to the peanut kernels is progressively lessened because the dogs or jaws approach alinement with the stems 40 and springs 41 belonging to them. The arrangement is in the nature of a toggle connection, wherefore although the springs 41 are under increasing compression the pressure exerted by the teeth of the jaws of the dogs upon the surface of the peanut kernel is progressively lessened. Where the teeth 42 engage the peanut kernel the resistance offered by the springs 41 is so relatively slight that they produce no material injury in the way of scoring upon the exposed surface of the kernel.

While in Figs. 8, 9 and 10 but two dogs are shown on opposite sides of the center line of travel, it will be understood that these are but representative of a complete series of dogs, usually six in number, arranged circumferentially about the center line of travel, but, of course, the dogs may number less or more than six. However, actual practice has demonstrated that six dogs arranged as stated give excellent satisfaction.

In the commercial type of machine the skinning devices are multiplied to the desired extent, a row of three being shown in Fig. 1, but the showing indicating a greater number. While the use of the invention is not limited to any particular number of skinning devices as embodied in a single machine, as many as ten have been employed in practice and such a machine is capable of operating at a speed making it commercially successful and economical for producing blanched whole peanuts, the term peanut, of course, having reference to the peanut kernel, and the machine being designed for operation upon cooked peanuts as distinguished from green peanuts.

While some features of the invention may be useful in connection with other articles than peanuts, it is particularly adapted for and particularly useful in connection with peanuts.

The teeth of the dogs wear in the course of time and new dogs must be substituted. Such renewal is facilitated by removing the block 11 with the parts carried thereby and then the cotter pins and pivot pins of the dogs are readily taken out, thus releasing the dogs so that they may be replaced by new dogs. The renewal may be required as often as once in thirty days, more or less.

What is claimed is:—

1. In a device for removing the skins from peanuts, a plurality of members arranged in a circular series and adapted to engage and hold the skin of a peanut kernel traveling therethrough, said members being mounted with reference to the path of the peanut kernels to cause the skin engaging portions thereof to approach each other and engage the forward end of the peanut during the initial portion of the travel of the latter through the series of members, and means for moving the kernel in the direction of its length through the series of members.

2. In a device for removing skins from peanuts, a plurality of rockable dogs arranged in a circular series, with each dog having a series of teeth to engage the skin of the peanut kernel and mounted to move toward the peanut for the initial portion of the travel of the latter through the circular series of dogs and then away from the peanut during the remainder of the travel of the peanut therethrough, and means for moving the peanut kernel in the direction of its length through the series of dogs.

3. In a device for removing skins from peanuts, the combination of means for moving each peanut progressively in the direction of its length, with a series of rockable dogs arranged about the path of the peanut and adapted to engage the skin of the peanut as the latter is forced forwardly, the dogs being mounted to each first engage the peanut to the rear of the forward end of the latter, then move with the peanut toward said forward end thereof, and then move away from the forward end of the peanut.

4. In a device for removing skins from peanuts, the combination of a plurality of engaging members having teeth to engage and hold the skin of a peanut and associated to define a passageway for the peanut smaller than the diameter of the latter, said members being mounted to move toward each other during the initial travel of the peanut through the passageway to thereby contract the passageway so as to engage the front extremity of the peanut, and then move away from each other to permit the ejection of the peanut through the passageway with the skin of the peanut retained by said engaging members.

5. In a device for removing the skins from peanuts, the combination of means for moving a peanut progressively in a line coinciding with the longitudinal axis of the nut, with skin-removing means acting to first progress with the moving peanut until the skin of the forward end of the nut is broken, said means then expanding and holding the skin while the peanut kernel is forced therethrough.

6. In a device for skinning peanuts, the combination with means for feeding the peanut progressively in a line coinciding with the longitudinal axis of the nut, of means movable with the nut and then away from the longitudinal axis thereof, said means having rupturing means for that portion of the skin at the front terminal of the nut, and holding means to engage the skin at the rear of the front terminal and strip said skin from the nut as the latter is forced forwardly.

7. In a device for removing skins from peanuts traveling therethrough, skinning means in encircling relation to the path of the peanut and mounted to first engage the skin back of the forward end of the peanut, then approach the forward end, and then widen out to allow the peanut to progress through the skinning means with the skin held by said skinning means from moving with the peanut.

8. In a device for removing skins from peanuts traveling therethrough, skinning means in encircling relation to the path of travel of the peanut and mounted to yield to the traveling peanut, said means first approaching toward and then receding from the line of travel, whereby the skin is first removed from the forward end of the peanut and then progressively to the rear thereof.

9. In a device for removing skins from peanuts traveling therethrough, skinning members in encircling relation to the path of travel of the peanut, and normally inturned and directed toward the entrance end of said device and mounted to yield to the traveling peanut with the inner ends first approaching toward and then receding from the line of travel of the peanut, whereby the skin is first removed from the forward end of the peanut and then progressively to the rear end thereof.

10. In a device for removing skins from peanuts traveling therethrough, skinning means in surrounding relation to the path of travel of the peanut and having a normal constraint toward said path, said skinning means being constructed and arranged to expansively yield to the passage of the peanut therethrough, and provided with means exerting progressively decreasing pressure on the skinning means on the recession of the skinning means from the normal position.

11. In a device for removing skins from peanuts traveling therethrough, a series of rockable skinning members in encircling relation to the path of travel of the peanut and provided with yieldable constraining means related to the rockable members to cause the latter to bear with progressively decreasing force upon the peanut on the approach of the larger portion of the peanut to said skinning members on the progress of the peanut therethrough.

12. In a device for removing skins from peanuts traveling therethrough, skinning means in encircling relation to the path of travel of the peanut and mounted to yield to the traveling peanut, said means first approaching toward and then receding from the line of travel of the peanut, whereby the skin is first removed from the forward end of the peanut and then progressively to the rear end thereof, and said skinning means being constrained to the inturned position and resistant with progressively decreasing forces to movement in opposition to said constraint.

13. In a device for removing skins from peanuts traveling therethrough, skinning members in encircling relation to the path of travel of the peanut and normally inturned and directed toward the entrance end of said device, and mounted to yield to the traveling peanut with their inner ends first approaching toward and then receding from the line of travel of the peanut, whereby the skin is first removed from the forward end of the peanut and then progressively to the rear end thereof, each skinning member having means constraining it to the inturned position and resistant with progressively decreasing force to movement of the skinning member outwardly.

14. In a device for removing skins from peanuts traveling therethrough, a series of pivoted dogs with springs in toggle relation thereto and the dogs in encircling relation to the path of travel of the peanut and normally inturned with their inner ends directed toward the entrance end of said device, said dogs yielding to a traveling peanut with their inner ends first approaching toward and then receding from the line of travel of the peanut and the dogs and springs moving toward alining position, whereby the skin is first removed from the forward end of the peanut and then progressively to the rear end thereof with the dogs bearing upon the peanut with progressively decreasing force as they move toward alining relation to their springs.

15. In a device for removing the skins from peanut kernels, means for moving the peanut kernel in the direction of its length, and a plurality of yieldable members of rigid material disposed about the path of the peanut and each rockable in a path lengthwise of the traveling peanut, said members having means for engaging the skin of the peanut kernel.

16. In a device for removing the skins from peanut kernels, a plurality of yieldable dogs arranged in a circular series and each movable about an axis tangential to an arc concentric with the axis of the series, each dog being provided with means for engaging and rupturing the skin of a peanut kernel, and means for moving the peanut kernel through the series of dogs in a path coinciding with the longitudinal axis of the series.

17. In a device for removing the skins from peanut kernels, a plurality of yieldable members arranged in circular series and each movable about an axis tangential to an arc concentric with the axis of the series, said members having a normal position defining a cone with the apex presented toward the direction of approach of the peanut to be treated, and each member being provided with means for engaging and rupturing the skin of the peanut kernel.

18. In a device for removing the skins from peanut kernels, a circular series of dogs each mounted to rock upon an axis tangential to an arc concentric with the axis of the circular series, with the dogs in normal position together defining a cone with its apex directed toward the path of the on-coming peanut to be treated, each dog having means for engaging and rupturing the skin of the peanut while the peanut is passing through the series of dogs.

19. In a device for removing the skins from peanut kernels, skinning members in the path of travel of the peanut, each member being mounted with relation to the path of the travel of the peanut to first engage the latter near the forward end and then move into closer relation to the forward extremity of the peanut, said member having means for slitting the skin of the peanut at its forward end and for then holding the skin while the traveling peanut is moved out of the skin.

20. In a device for removing the skins from peanut kernels, a circular series of dogs each having means for engaging and rupturing the skin of the peanut while passing through the series and the series of dogs in normal position defining a cone with its apex presented toward the path of the on-coming peanut to be treated, and said dogs being mounted to move with the on-coming peanut to bring their adjacent ends into closer relation and to then spread apart to permit the passage of the peanut between them, whereby the adjacent ends of the dogs first engage the skin of the peanut close to the forward end of the latter, and then move into closer relation to the forward extremity of the peanut, and finally engage and hold the skin of the peanut while the kernel is expelled from the held skin.

21. In a device for removing the skins from peanut kernels, a rockable member having a laterally expanded jaw with teeth on opposite sides having their active portions arranged transversely of the length of the jaw, and a centrally located terminal tooth extending lengthwise of the jaw and having a portion adapted to cut and break the skin of the peanut kernel where engaged by the tooth.

22. In a device for removing the skins from peanut kernels, a plurality of yieldable members arranged in circular series and each movable about an axis tangential to an arc concentric with the axis of the series, said members having a normal position defining a cone with the apex presented toward the direction of approach of the peanut to be treated and each member being provided with means for engaging and rupturing the skin of the kernel, and means for propelling the peanut kernel through the series of members in the path coinciding with the longitudinal axis of the series.

23. In a device for removing the skins from peanuts, a plurality of yieldable members arranged in circular series and each movable about an axis tangential to an arc concentric with the axis of the series, each member being provided with means for engaging and rupturing the skin of a peanut kernel, with the series of members in normal position defining a cone having its apex presented toward the direction of approach of the peanut to be treated, and said members each having a range of movement from the normal position to bring those ends presented toward the apex of the cone into closer relation and then to spread them apart on the progressive movement of the members about their individual axes when the series is traversed by the peanut, and means for propelling a peanut kernel through the series of members in a path coinciding with the longitudinal axis of the series.

24. In a device for removing the skins from peanut kernels, an elongated skin engaging dog mounted to rock on an axis transverse of its length and having a laterally expanded jaw end with teeth on opposite sides provided with active portions arranged transversely of the length of the jaw, and said jaw having a centrally located terminal tooth extending lengthwise of the jaw and provided with a longitudinally extended cutting edge and ending in a portion adapted to break and pierce the skin of the peanut kernel where engaged by the tooth.

25. In a device for removing the skins from peanut kernels, a circular series of dogs each mounted upon an axis tangential to an arc concentric with the axis of the circular series with the dogs of the series in normal position defining a cone with its apex presented toward the direction of approach of the on-coming peanut to be treated, and each dog having means for engaging and rupturing the skin of the peanut while passing through the series of dogs, said means comprising a terminal tooth at the nose end of the dog and other teeth anterior thereto and directed retrogressively with respect to the direction of movement of the peanut when engaged by the teeth.

26. In a device for removing the skins from peanut kernels, a circular series of dogs each mounted upon an axis tangential to an arc concentric with the axis of the circular series with the dogs of the series in normal position defining a cone with its apex presented toward the direction of approach of the on-coming peanut to be treated, and each dog having means for engaging and rupturing the skin of the peanut while passing through the series of dogs, said means comprising a terminal tooth at the nose end of the dog and other teeth anterior thereto and directed retrogressively with respect to the direction of movement of the peanut when engaged by the teeth, the forward tooth extending lengthwise of the dog and the other teeth having their engaging edges arranged transversely of the length of the dog.

27. In a device for removing the skins from peanut kernels, a circular series of members having jaw ends provided with means for engaging the skin of a peanut traversing the series to strip the skin from the peanut with each member having an intermediately located pivot support about which said member is rockable on an axis tangential to an arc concentric with the longitudinal axis of the series, and the members of said series having a normal position defining a cone with the apex in the path of and presented toward an approaching peanut to be treated, and yieldable constraining means for each member connected thereto on the side of the pivot support remote from the jaw.

28. In a device for removing the skins from peanut kernels, a series of dogs having jaw ends provided with means for engaging the skin of a peanut to strip the skin from the peanut, each jaw having an intermediately located pivot support about which the dog is rockable tangential to an arc concentric with the longitudinal axis of the series, and said series of dogs having a normal position defining a cone with the apex in the path of and presented toward but approaching a peanut to be treated, and yieldable constraining means for each dog connected thereto and including a spring yieldingly resistant to forces tending to rock the jaw away from its normal position.

29. In a device for removing the skins from peanuts, a tubular guide for the peanuts, and a plurality of yieldable members each provided with means for engaging the skin of the peanut and stripping it therefrom, said members being located beyond the discharge end of the guide with their peanut engaging portions movable lengthwise of the peanut and toward each other into engagement with the forward extremity of the peanut issuing from the guide.

30. A device for removing the skins from peanuts, comprising a support, a tubular guide carried thereby and expansively yieldable to the passage of a peanut therethrough, and a series of pivoted dogs mounted at the discharge end of the tubular guide and each provided with skin breaking means, said dogs being yieldable in a direction away from the discharge end of the guide.

31. In a device for removing the skins from peanuts, a tubular guide for the peanuts tapering toward the discharge end and a conically arranged series of yieldable members each having means for engaging the skin of the peanut and stripping it from the kernel, said conically arranged series having the apex of the cone directed toward the discharge end of the guide.

32. In a device for removing the skins from peanuts, a tubular guide for the peanuts tapering toward the discharge end, and there expansively yieldable to the passage of a peanut, and a conically arranged series of yieldable members provided with means for engaging and removing the skins from the peanuts, said series of yieldable members having the apex of the cone directed toward the discharge end of the guide with the members yieldable in the direction of travel of the peanut issuing from the guide to first approach and then recede from each other as the peanut moves through said series of yieldable members.

33. In a device for removing skins from peanuts, a tubular guide for the peanuts, a series of rockable members provided with means for engaging and removing the skins from the peanuts and located beyond the discharge end of the guide, said rockable members having a range of movement with a traveling peanut in a direction away from the discharge end of the guide, and a plunger movable through the guide and series of rockable members and having a range of travel to propel a peanut through the guide and through and beyond the yieldable series of peanut skinning members.

34. In a device for removing skins from peanuts, a tubular guide for the peanuts consisting of a circular series of spaced fingers, a series of rockable members with peanut skinning means thereon located beyond the discharge end of the guide in alinement with the fingers composing the guide, and similarly spaced, and a plunger movable through the guide and rockable members and provided with spaced portions conforming to the spaces between the fingers and rockable members.

35. In a device for removing the skins from peanuts, a tubular guide for the peanuts consisting of a circular series of spaced taper spring fingers supported at the larger end and outwardly yieldable at the smaller end to the passage of a peanut therethrough, and a series of yieldable members with peanut skinning means thereon located beyond the discharge end of the guide and in alinement with the fingers composing the guide, said device also being provided with a plunger having a series of spaced blades movable with the plunger through the guide in the spaces separating the fingers thereof and also through the series of yieldable members.

36. In a device for skinning peanuts, a tubular guide composed of a series of equispaced fingers, said fingers being supported at one end and the guide tapering toward the other end with the fingers there elastically yieldable to the passage of a peanut therethrough, and a series of similarly spaced yieldable members with skin engaging means thereon for engaging and removing the skin from the peanut, said series of yieldable members being associated in the form of a cone with the apex of the cone directed toward the discharge end of the guide and the members being spaced in conformity with the spacing of the fingers of the guide and in substantial alinement therewith, said fingers being movable by the progressive movement of a peanut through the series and by the engagement of the forward end of the projecting peanut with the apex portion of the series to approach each other and then recede as they move away from the discharge end of the tubular guide.

37. In a device for skinning peanuts, a tubular guide composed of a series of equispaced fingers, said fingers being supported at one end and the guide tapering toward the other end with the fingers there elastically yieldable to the passage of a peanut therethrough, and a series of similarly spaced yieldable members with skin engaging means thereon for engaging and removing the skin from the peanut, said series of yieldable members being associated in the form of a cone with the apex of the cone directed toward the discharge end of the guide and the members being spaced in conformity with the spacing of the fingers of the guide and in substantial alinement therewith, said members being movable by the progressive movement of a peanut through the series and by the engagement of the forward end of the traveling peanut with the apex portion of the series to approach each other and then recede as they move away from the discharge end of the tubular guide, and said device being also provided with a plunger having a series of elongated spaced blades conforming in positioning and spacing to the spaces between the fingers of the guide and between the members of the series of skinning members and having a range of movement to propel a peanut through the guide and through the series of skinning members and expel the peanut from that end of the series of members remote from the guide.

38. A device for removing the skins from peanuts comprising a supporting member, an elongated tubular guide having walls yieldable outwardly from the longitudinal center line of the guide, a circular series of posts exterior to the guide, ring-shaped members carried by the posts and spaced apart longitudinally of the posts in surrounding relation to the tubular guide, a circular series of dogs each intermediately pivoted on the post-carried member remote from the support with the dogs having jaw ends normally defining a cone with the apex directed toward the end of the tubular guide remote from the support, and elastically yieldable constraining means for the dogs guided by the post-carried member adjacent to the support.

39. A device for removing the skins from peanuts, comprising a supporting member, a tubular guide carried by the supporting member and comprising a circular series of spring fingers each carried at one end by the support and tapering toward the other end and there free, the guide also tapering toward said end and there elastically yieldable to expansive forces, a frame mounted on the support, and a circular series of pivoted dogs mounted on the frame to rock each on an axis tangential to an arc concentric with the longitudinal axis of the series, with jaw ends normally directed toward said axis of the series and defining a cone with the apex directed toward the outlet end of the tubular guide, and elastic constraining means carried by the frame and connected to each dog for permitting the dog to rock on its pivotal axis in a direction away from the exit end of the guide.

40. A device for removing the skins from peanuts, comprising a supporting member, a tubular guide carried by the supporting member and comprising a circular series of spring fingers each carried at one end by the support and tapering toward the other end and there free, the guide also tapering toward said end and there elastically yieldable to expansive forces, a frame mounted on the support, and a circular series of pivoted dogs mounted on the frame to rock each on an axis tangential to an arc concentric with the longitudinal axis of the series with jaw ends normally directed toward said axis of the series and defining a cone with the apex directed toward the outlet end of the tubular guide, and elastic constraining means carried by the frame and connected to each dog for permitting the dog to rock on its pivotal axis in a direction away from the exit end of the guide, the skin removing device having associated therewith a reciprocable plunger with a circular series of longitudinally extended radial blades alining with the spaces between the tongues of the tubular guide and between the inner ends of the dogs.

41. A device for removing skins from peanut kernels, comprising a block with a passage transversely thereof, a circular series of circumferentially spaced spring fingers each supported at one end on the block adjacent to the opening therethrough and tapering and approaching toward the other end and there elastically yieldable to expansive forces, a frame supported on the block in surrounding relation to the guide, a circular series of dogs each pivotally mounted on the frame to rock on an axis tangentially to an arc concentric with the longitudinal axis of the series and of the guide, elastically yieldable members connected to the dogs and constraining them to normally define a cone with the apex directed toward the small end of the guide with the dogs coinciding with the spring fingers, and each dog having the portion directed toward the apex of the cone in the form of a laterally expanded jaw with teeth on opposite sides, and an elongated tooth at the end, and a plunger movable through the passage in the block, through the guide, and through the series of dogs for forcing a peanut therethrough in the direction of the longitudinal axis of the peanut.

42. A device for removing skins from peanut kernels, comprising a block with a passage transversely thereof, a circular series of circumferentially spaced spring fingers each supported at one end on the block adjacent to the opening therethrough and tapering and approaching at the other end and there elastically yieldable to expansive forces, a frame supported on the block in surrounding relation to the guide, a circular series of dogs each pivotally mounted on the frame to rock on an axis tangential to an arc concentric with the longitudinal axis of the series and of the guide, elastically yieldable members connected to the dogs and constraining them to normally define a cone with the apex directed toward the small end of the guide with the dogs coinciding with the spring fingers, and each dog having the portion directed toward the apex of the cone in the form of a laterally expanded jaw with teeth on opposite sides and an elongated tooth at the end, and a plunger movable through the passage in the block, through the guide, and through the series of dogs for forcing a peanut therethrough in the direction of the longitudinal axis of the peanut, said plunger having the peanut engaging end in the form of a circular series of longitudinally extended radial blades positioned with respect to the spring tongues and dogs to travel in the spaces separating the spring tongues and dogs.

43. In a device for removing the skins from peanut kernels, a rockable member having a laterally expanded jaw with teeth on opposite sides and a centrally located terminal tooth having an active portion extending lengthwise of the jaw, the active edges of the teeth defining a convex curve lengthwise of the jaw.

44. In a device for removing the skins from peanut kernels, a rockable member having a laterally expanded jaw with teeth on opposite sides having their active ends arranged transversely of the length of the jaw, and a terminal tooth having its active portion extending longitudinally of the jaw, the tooth edge of the jaw curving convexly lengthwise of the jaw.

45. In a device for removing the skins from peanut kernels, a rockable member with a terminal tooth having its active portion extending longitudinally of the member and other teeth back of the longitudinal tooth having active portions extending transversely with respect to the longitudinal tooth.

46. In a device for removing skins from peanut kernels, a metallic rockable member having a longitudinally disposed slitting means, and means to the rear of the first-named means for engaging and holding the skin of a peanut longitudinally slit by the first-named means.

In testimony, that I claim the foregoing as my own, I have hereto affixed my signature in the presence of two witnesses.

CHARLES F. LAGANKE.

Witnesses:
 M. H. KELLY,
 W. W. KELLY.